(12) United States Patent
Jackson et al.

(10) Patent No.: US 9,192,142 B2
(45) Date of Patent: Nov. 24, 2015

(54) SYSTEMS AND METHODS FOR PROVIDING PRODUCTS TO ANIMALS

(75) Inventors: Janet R. Jackson, Columbia, IL (US); Peter Van Bladeren, Corseaux (CH)

(73) Assignee: Nestec SA, Vevey (CH)

(*) Notice: Subject to any disclaimer, the term of this patent is extended or adjusted under 35 U.S.C. 154(b) by 390 days.

(21) Appl. No.: 12/998,135

(22) PCT Filed: Sep. 16, 2009

(86) PCT No.: PCT/US2009/005179
§ 371 (c)(1),
(2), (4) Date: Apr. 15, 2011

(87) PCT Pub. No.: WO2010/033197
PCT Pub. Date: Mar. 25, 2010

(65) Prior Publication Data
US 2011/0192351 A1     Aug. 11, 2011

Related U.S. Application Data

(60) Provisional application No. 61/192,797, filed on Sep. 22, 2008.

(51) Int. Cl.
*A01K 5/00*     (2006.01)
*A01K 5/02*     (2006.01)

(52) U.S. Cl.
CPC .................................. *A01K 5/0275* (2013.01)

(58) Field of Classification Search
CPC ....... A01K 5/02; A01K 5/0274; A01K 15/02; A01K 11/006

USPC ................................ 119/51.02, 51.11, 53, 54
See application file for complete search history.

(56) References Cited

U.S. PATENT DOCUMENTS

| 3,897,753 | A | * | 8/1975 | Lee et al. ................. 119/51.02 |
| 7,409,924 | B2 | | 8/2008 | Kates |
| 2006/0011146 | A1 | | 1/2006 | Kates |
| 2006/0161293 | A1 | * | 7/2006 | William et al. ............... 700/216 |

(Continued)

FOREIGN PATENT DOCUMENTS

| cn | 101014240 | 6/2005 |
| JP | 06086614 | 3/1994 |

(Continued)

OTHER PUBLICATIONS

International Search Report & Written Opinion for PCT/US09/05179 dated Nov. 2, 2009.

(Continued)

*Primary Examiner* — Richard Price, Jr.
(74) *Attorney, Agent, or Firm* — Ronald A. Burchett

(57) ABSTRACT

Systems and methods for providing nutritional and other products to animals are provided. Generally, the invention provides a dispensing system comprising an activity monitoring device, and a dispensing device comprising a processor programmed to receive a communication generated by the activity monitoring device. The processor controls the dispensing device to dispense a nutritional or other product in response to the communication from the activity monitoring device. The activity monitoring device can be attached to an animal and communicate with the dispensing device information regarding the nutritional requirements of the animal.

16 Claims, 2 Drawing Sheets

(56) References Cited

U.S. PATENT DOCUMENTS

2006/0201433 A1\* 9/2006 Kates ................. 119/51.02
2008/0216765 A1   9/2008 Kates

FOREIGN PATENT DOCUMENTS

| JP | 06086614 | A2 | 3/1994 |
| JP | 11018608 | A2 | 1/1999 |
| JP | 2001028961 | A2 | 2/2001 |
| JP | 2006042670 | | 2/2006 |
| JP | 2006042670 | A2 | 2/2006 |

OTHER PUBLICATIONS

English translations for JP06086614, JP2006042670, JP11018608, and JP2001028961.

\* cited by examiner

SYSTEMS AND METHODS FOR PROVIDING PRODUCTS TO ANIMALS

CROSS REFERENCE TO RELATED APPLICATIONS

This application is a national stage application under 35 U.S.C. §371 of PCT/US2009/005179 filed Sep. 16, 2009, which claims priority to U.S. Provisional Application Ser. No. 61/192,797 filed Sep. 22, 2008, the disclosures of which are incorporated herein by reference.

BACKGROUND OF THE INVENTION

1. Field of the invention

The invention generally relates to systems and methods for providing products to animals and particularly to systems and methods for providing nutritional and other products to animals.

2. Description of Related Art

To maintain health and wellness and ensure a good quality of life, animals should be fed an appropriate amount of a healthy and nutritious diet on a regular basis. However, feeding methods and patterns often result in an animal receiving inadequate nutrition or unhealthy amounts of food. Studies have shown that many animals such as cats naturally eat several times per day, in some instances as many as 10 to 20 small meals per day. However, an animal caretaker typically serves food 1 or 2 times per day and leaves the food exposed and available to the animal during the remainder of the day. For example, if a three ounce portion of wet cat food is fed to a cat, the cat may eat only a small portion of the food. The remainder quickly dries and becomes unpalatable. As a result, the cat does not eat the remaining portion, which must be discarded. This wastes a lot of food, increases the cost of feeding the animal, and places the animal at risk for the effects of poor nutrition. Similarly, many animals have other issues related to feeding and nutrition. For example, aging animals may have trouble maintaining hydration. Many cats receive most of their water from wet cat food, which is approximately 78% moisture. If the cats do not eat enough food or if they eat food with inadequate moisture because the food has dried and become unpalatable, the cats may not get enough water or may not get water in a regular manner that supports good health and wellness.

In the United States, it is estimated that between 25% and 40% of companion animals are overweight or obese. Generally, an animal is considered overweight if it weighs more than 10% above its ideal body weight and obese if it weighs more than 15% above its ideal body weight. Obesity in companion animals is implicated in increased risk of diabetes mellitus, arthritis, pancreatitis, hepatic lipidosis, orthopedic disorders, cardiovascular disease, respiratory ailments, hip dysplasia, liver disease, gastrointestinal disorders, and skin problems. Further, some breeds of dogs and cats have particular propensities for rapid weight gain in spite of a diligent owner's attempts to curb the animal's increasing weight, generally by limiting food intake. Often, excess weight and obesity can be linked to access to and consumption of too much food, particularly in combination with too little physical activity. Feeding methods that involve feeding relatively large food portions on an irregular or infrequent basis often result in an animal consuming too much food. Most dogs and many cats eat whatever food is available. If excess food is exposed and available, the animal consumes too much food and becomes overweight or obese.

Problems related to improper feeding methods and with controlling food intake inhibit animals from receiving proper nutrition that supports health and wellness and ensures a good quality of life for the animal, particularly if an inactive animal becomes overweight or obese. Given these feeding and nutrition issues, there is, therefore, a need for novel systems and methods for feeding animals a healthy amount of palatable and nutritious foods or a regular basis.

SUMMARY OF THE INVENTION

The invention relates to systems and methods for providing nutritional and other products to animals. In a general embodiment, the invention provides a dispensing system comprising an activity monitoring device and a dispensing device comprising a processor configured to receive a communication generated by the activity monitoring device. In one embodiment, the processor is capable of controlling the dispensing device to dispense a product in response to the communication from the activity monitoring device. In another embodiment, the communication from the activity monitoring device is directed to a status of one or more animals. In another embodiment, the processor is configured using an algorithm that determines when to dispense a product from the dispensing device based upon the communication received from the activity monitoring device.

In one embodiment, the communication comprises information selected from the group consisting of heart rate, activity, weight, height, zoometric data, and combinations thereof of an animal wearing the activity monitoring device.

In various embodiments, the activity monitoring device is selected from the group consisting of an accelerometer, a pedometer, and combinations thereof. Such device comprises a means for communicating with the dispensing device. In one embodiment, the activity monitoring device wirelessly communicates with the dispensing device.

In an embodiment, the dispensing device is constructed and designed to dispense a product selected from the group consisting of water, beverages, foods, treats, toys, supplements, medications, gels, and combinations thereof.

In one embodiment, the processor comprises information about the amount and type of a product selected from the group consisting of water, beverages, foods, treats, toys, supplements, medications, gels, and combinations thereof that is contained within the dispensing device. In another embodiment, the processor comprises information about a characteristic of one or more animals, e.g., the identity, breed, age, size, weight, caloric needs, or health status. In an embodiment, the characteristic of the animal is selected from the group consisting of identity, age, weight; caloric needs, health status, and combinations thereof.

In another embodiment, the invention provides a dispensing system comprising a dispensing device comprising a motion detector, a processor, a dispensing mechanism, and one or more product storage chambers. The processor can be configured to receive a communication generated from the motion detector. In one embodiment, the processor is capable of controlling the dispensing device to dispense a product in response to a motion of an animal detected by the motion detector. In another, the processor comprises programmed information about an animal. In a further, embodiment, the processor is configured using an algorithm that determines when to dispense a product from the dispensing device based upon programmed information about an animal and an activation of the motion detector by the animal.

In an embodiment, the dispensing system comprises an activity monitoring device configured to communicate with the processor, the activity monitoring device comprising information selected from the group consisting of heart rate, activity, weight, height, zoometric data, and combinations thereof of an animal wearing the activity monitoring device.

In an alternative embodiment, the invention provides a dispensing system comprising a transmitter constructed and arranged to attach to an animal, and a dispensing device comprising a sensor, a processor, a dispensing mechanism, and one or more product storage chambers. The processor can be linked to the sensor and configured to receive a communication generated from the transmitter.

In an embodiment, the transmitter comprises information about the animal selected from the group consisting of animal identification, animal food preferences, animal calorie requirements, animal nutritional requirements, and combinations thereof In an embodiment, the processor is capable of controlling the dispensing device to dispense a product in response to the communication from the transmitter. In another embodiment, the processor comprises programmed information selected from the group consisting of types of food stored in the dispensing device, quantity of food stored in the dispensing device, animal identification, animal food preferences, animal calorie requirements, animal nutritional requirements, and combinations thereof.

In an embodiment, the dispensing system comprises an activity monitoring device configured to communicate with the processor, the activity monitoring device comprising information selected from the group consisting of heart rate, activity, weight, height, zoometric data, and combinations thereof of the animal wearing the activity monitoring device.

In yet another embodiment, the invention provides a method of providing nutrition. The method comprises providing an activity monitoring device, and dispensing a product from a dispensing device comprising a processor. The product can be dispensed upon the processor receiving a communication from the activity monitoring device. In an embodiment, the method comprises dispensing the product from the dispensing device at predetermined intervals.

In still another embodiment, the invention provides a method for dispensing a product. The method comprises providing a dispensing device comprising a motion detector, a dispensing mechanism, one or more product storage chambers, and a processor configured to receive a communication from the motion detector. The method further comprises dispensing a product from the dispensing device upon the processor receiving a communication generated from the motion detector detecting the presence of an animal.

In an embodiment, the processor is configured using an algorithm that determines when to dispense a product from the dispensing device based upon programmed information about the animal and an activation of the motion detector by the animal.

In an embodiment, the method comprises attaching to the animal an activity monitoring device configured to communicate with the processor, the activity monitoring device comprising information selected from the group consisting of heart rate, activity, weight, height, zoometric data, and combinations thereof of the animal wearing the activity monitoring device.

In an alternative embodiment, the invention provides a method for dispensing a product. The method comprises attaching a transmitter to an animal, and dispensing a product from a dispensing device comprising a sensor, a processor linked to the sensor, a dispensing mechanism, and one or more product storage chambers. The product can be dispensed upon the sensor receiving a communication generated from the transmitter.

In an embodiment, the method comprises attaching to the animal an activity monitoring device configured to communicate with the processor, the activity monitoring device comprising information selected from the group consisting of heart rate, activity, weight, height, zoometric data, and combinations thereof of an animal wearing the activity monitoring device.

In an embodiment, the transmitter and the activity monitoring device comprise a single unitary device.

The dispensing system can be used to provide nutrition or other products to any suitable animal, e.g., a pet or domestic animal.

An advantage of the invention is to provide an improved system for delivering a nutritional or other product to an animal. Another advantage of the invention is to provide an improved method of delivering a product to an animal. Yet another advantage of the invention is to provide a pet owner with a convenient way to deliver a fresh food product to a pet throughout the day. Still another advantage of the invention is to provide an automated way to deliver a nutritional product to a pet throughout the day. Another advantage of the invention is to provide a method for providing weight management in a pet. Another advantage is to provide small portions to animals, particularly cats, so that the animal gets the benefit of the moisture in the food before the moisture evaporates as the food sits exposed to the atmosphere. This advantage provides an animal with food that is not oxidized and, therefore, more palatable.

Other and further objects, features, and advantages of the invention will be readily apparent to those skilled in the art.

DETAILED DESCRIPTION OF THE INVENTION

Figure 1:
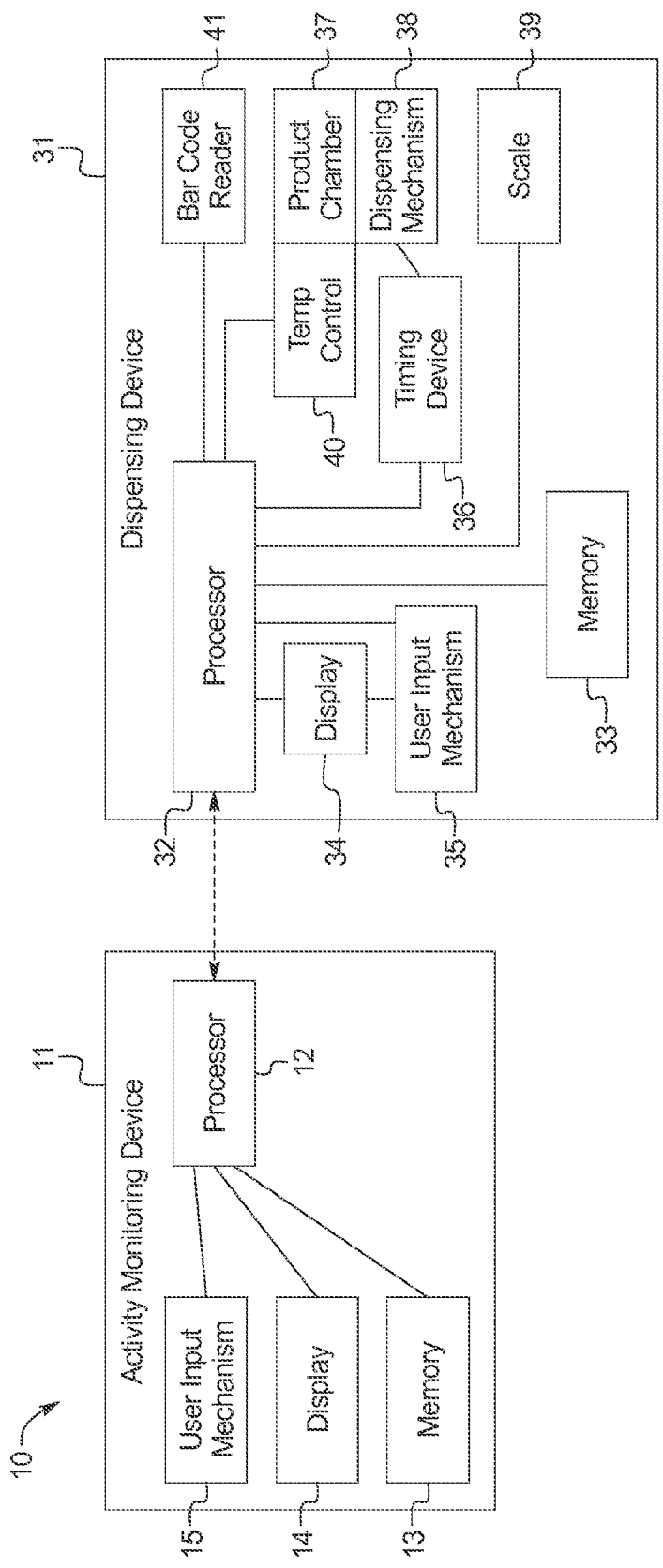
FIG. 1 shows an embodiment of a dispensing system provided by the present disclosure.
Figure 2:
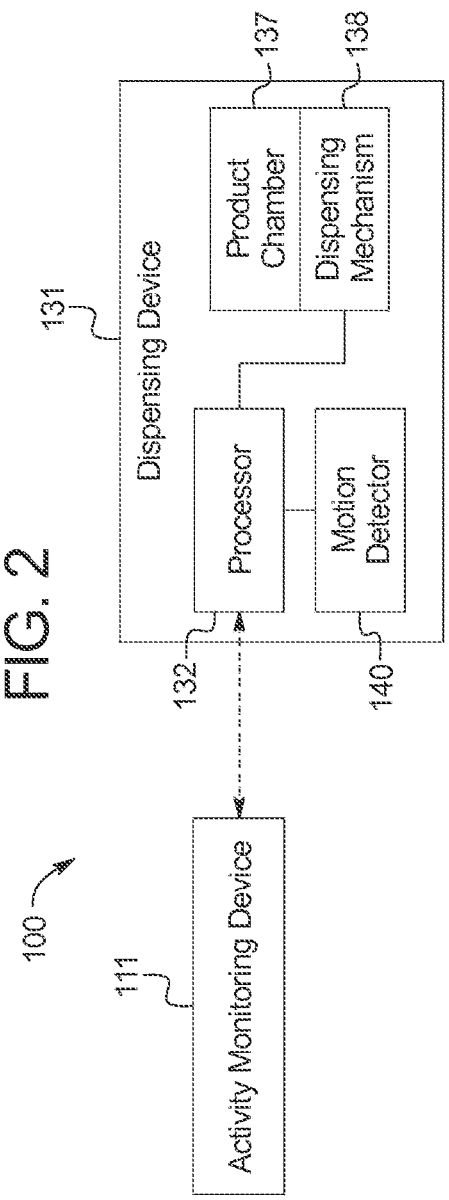
FIG. 2 shows an embodiment of a dispensing system provided by the present disclosure.
Figure 3:
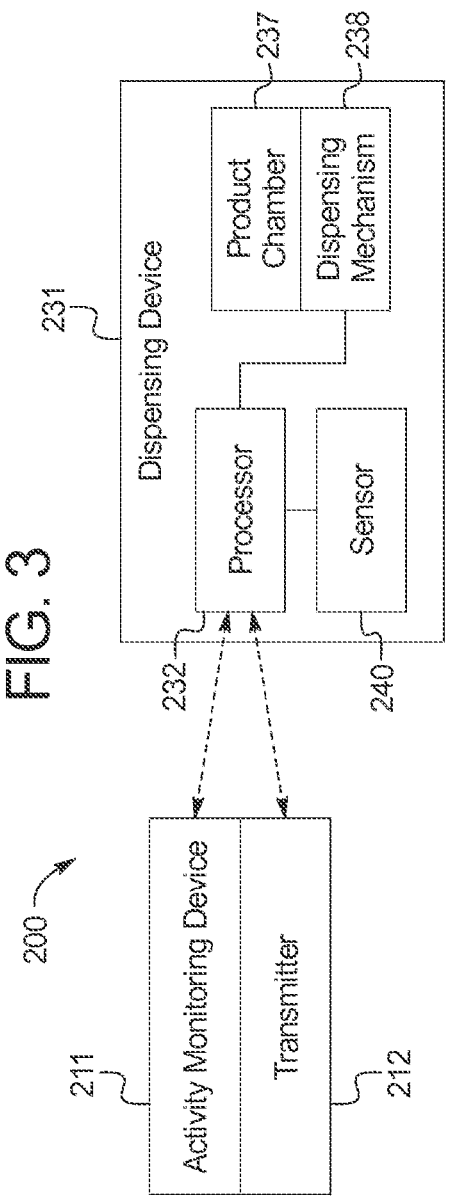
FIG. 3 shows an embodiment of a dispensing system provided by the present disclosure.

The invention provides systems and methods for providing nutritional and other products to animals. In a general embodiment, the dispensing system delivers predetermined amounts of a nutritional or similar product (e.g., water, beverages, foods, supplements, treats, toys such as rawhides and artificial bones, medications, medicaments, etc.) to an animal at specific intervals throughout a predetermined period, e.g., the day, a weekend, or a week. For example, the dispensing system delivers fresh, precise servings of a wet pet food to a pet animal such as a cat or a dog. In one embodiment, the dispensing system provides for timed released and controlled portions of a nutritional product to assist with weight management or proper nutrition. In alternative embodiments, the dispensing system incorporates an activity monitoring device, a motion sensor, and/or a transmitter to release one or more nutritional or other products specifically designed for one or more animals. In a preferred embodiment, the nutritional product is a complete and nutritionally-balanced food suitable for an animal, particularly a pet such as a dog or a cat.

In a general embodiment, the invention provides a dispensing system 10 comprising an activity monitoring device 11 and a dispensing device 31 comprising a processor 32 configured (e.g., programmed) to receive a communication generated by the activity monitoring device 11. The processor 32 is capable of controlling the dispensing device 31 to dispense a product in response to the communication from the activity monitoring device 11. The activity monitor device 11 and the dispensing device 31 can also comprise appropriate memory 13, 33 (e.g., computer chips), displays 14, 34 (e.g., screen), and user input mechanisms 15, 35 (e.g., keyboard, buttons) to allow a user to input/program and control the activity monitoring device 11 and dispensing device 31. Typically, the activity monitoring device 11 is affixed to an animal. The activity monitoring device 11 monitors the activity of the animal and communicates with the dispensing device 31. Based upon information from the activity monitoring device 11, the dispensing device 31 provides a product such as food or water to the animal in an amount that correlates with the animal's activity, i.e., the more active the animal is the more food or water the animal receives from the dispensing device.

In another embodiment, the dispensing device 31 incorporates a timing device 36 to determine when the nutritional product should be dispensed to an animal. The timing device 36 works in conjunction with the activity monitoring device 11. In another embodiment, the dispensing device 31 comprises a timing device 36 that can be preset or programmed by an operator to meet the nutritional and behavioral needs of an animal receiving product from the dispensing device 31. Such schedule is often dependent on the animal's sleep-wake patterns and their nocturnal behavior. For example, when the dispensing device 31 is used to provide nutrition to a cat, the dispensing device 31 can be set or programmed to provide product on an irregular schedule that complements the cat's behavior. In an illustrative embodiment, the dispensing device 31 can be set or programmed to provide 4 meals in the morning, 2 small meals in the afternoon, 1 meal in the evening, and 3 meals overnight. This type of schedule is based upon the cats typical feeding schedule, sleep-wake pattern, and nocturnal behavior. Similar types of feeding patterns would be known to the skilled artisan depending on the animal and its behavior.

The dispensing device processor 32 operates and controls the dispensing device 31 to dispense the product (e.g., nutritional product) based upon a communication or signal from the activity monitoring device 11. For example, if the animal is very active, a predetermined amount of nutritional product can be dispensed in amounts consistent with such activity or calorie expenditure. An active animal can have more nutritional product dispensed than a less active animal.

The dispensing device processor 32 can also be programmed with information about one or more animals. When the animal approaches the dispensing device 31 to within a specified distance, the activity monitoring device 11 communicates with the processor 32 and the processor 32 dispenses a predetermined amount of nutritional product depending upon the identity and/or characteristics of the animals. For example, an overweight animal can have less nutritional product dispensed than an underweight animal. A large animal can have more nutritional product dispensed than a small animal. The amount of nutritional product to be dispensed can also be determined based on the characteristics of the animal in conjunction with the amount of activity from the animal as recorded by activity monitoring device 11.

In various embodiments, the dispensing device 31 is designed and constructed to emit or otherwise send a signal when the food is ready for consumption, e.g., a visual, audible (e.g., human voice), or olfactory signal.

In another embodiment, the dispensing system 31 contains a heater element to raise the temperature of food if desired.

In another embodiment, the dispensing system 31 contains a bar code reader 41 to identify the type and amount of food or other ingredients used with the device 31. The reader 38 is any suitable device for reading various bar codes, e.g., one, two, or three dimensional bar codes.

The activity monitoring device 11 can be any suitable device that measures an activity parameter of an animal such as, for example, an accelerometer, a pedometer, or a combination thereof. The activity monitoring device 11 can be designed to attach to the animal in any suitable manner. For example, the activity monitoring device 11 includes, without limitation, a strap, pin, clip, collar, or belt, which can be attached to any part of the animal.

In one embodiment, the activity monitoring device 11 comprises a processor 12 that calculates or determines the amount of calories burned by the activity of the animal, e.g., using information about the animal's height, weight, age, gender, activity, etc. The active metabolic rate or resting metabolic rate of the animal can be determined using a suitable calorimeter. This information can be sent to the processor 32 of the dispensing device 31, and the dispensing device 31 can dispense the appropriate amount of nutritional product to maintain the proper health of the animal. Alternatively, the dispensing device processor 32 can perform this analysis using information about the animal and information recorded from the activity monitoring device 11.

An example of a suitable activity monitor 11 is the NEW LIFESTYLES® activity monitor by New-Lifestyles, Inc., which can be used to count the steps of the user. This type of activity monitor can be programmed/designed to send a communication to a dispensing device 31 at predetermined intervals through the day or whenever the animal is with a certain range of the dispensing device 31.

In an embodiment, the activity monitoring device 11 wirelessly communicates with the dispensing device 31. The activity monitoring device 11 can send the wireless communication to the dispensing device processor 32 to provide information about various activities of the animal. The communication from the activity monitoring device 11 can be directed to a status of one or more animals wearing the activity monitoring device 11. For example, the communication can be based on information directed to the animal's heart rate, activity, weight, height, or a combination thereof.

The dispensing device processor 32 can be configured using one or more algorithms that determine how much nutritional product to dispense and when to dispense it from the dispensing device 31 based upon the communication received from the activity monitoring device 11. For example, the processor 32 can be programmed using an algorithm that determines the precise amount of nutritional product and amount to be dispensed based upon heart rate and activity of the animal. If there is more than one type of nutritional product stored in the dispensing device 31, the processor 32 can also be programmed using an algorithm that determines which nutritional product to dispense to provide appropriate nutrition to the animal based on the status of the animal given by the activity monitoring device 31.

The dispensing system 10 as a whole can be suitable for delivering appropriately sized, nutritional product servings to any type of animal for any specific nutritional objectives throughout the day. For example, the dispensing device 31, in conjunction with the communication received from the animal monitoring device 11, can dispense the proper amounts and types of nutritional products specifically designed for the animal to ensure proper nutrition while managing weight. Other health characteristics of the animal such as illness, injury, age, etc., can be considered in determining how much and what type of nutritional product to dispense.

The nutritional products can be based upon the animal's energy, caloric and/or health needs, for example, as determined by an owner, care-giver or health care provider. In an embodiment, the products can be nutritional capsules comprising a predetermined amount of a pet nutritional product (e.g., wet or dry). A pet owner could fill the dispensing device 31 with a variety of capsules of nutritional products as a way to add variety and feel confident that their pet would receive, for example, fresh wet food over several days period. This would increase the convenience of feeding wet food. The dispensing device 31 could dispense contents of the capsules at a predetermined time and rate. In another embodiment, the products can be pouches comprising a predetermined amount of a product (e.g. nutritional or refreshing and in liquid or gel forms). In another embodiment, the product can comprise a bar code to enable its identification (e.g. nutritional value or expiration date) by the dispensing device 31.

The dispensing device 31 can have the ability to store one or more nutritional products in any suitable form (e.g., liquid, solid, powder, fresh, preserved, gelatin, etc.). The dispensing device 31 can be constructed and designed to dispense one or more products such as water, beverages, foods, supplements, medications, or a combination thereof. For example, the dispensing device 31 can comprise one or more chambers 37 constructed and arranged to hold the specific product and dispense the product from the dispensing device 31, for example, directly into a bowl, dish other suitable product container.

The dispensing device 31 can also comprise a suitable dispensing mechanism 38 that provides a way for the product stored in the dispensing device 31 to be released from the dispensing device 21 as understood by the skilled artisan. The dispensing mechanism 38 can actively dispense the product, for example, through the use of motor/gears that push the product out of the dispenser. Alternatively, the dispensing mechanism 38 can passively dispense the product, for example, by removing a door to the product chamber 37 and allowing the product to drop or be released from the chamber 37 by gravity. Any suitable container such as a plate or bowl can be placed near the dispensing device 31 to receive the dispensed nutritional product. In one embodiment, the dispensing device 31 provides a food directly in one element of a capsule designed as a bowl suitable for an animal. In another embodiment the food receptacle (e.g. bowl, plate or container) is removable and washable, e.g., in dishwasher. In another embodiment, the dispensing device 31 comprises a means to measure any leftover food. For example, the food receptacle is placed on a scale 39 to weight leftover food and ensure that the animal consumed, at the end of the day, the proper amount of food corresponding to the animal's nutritional requirements.

In one embodiment, the dispensing device 31 comprises a means 40 for controlling the temperature of the product. For example, when the product is perishable, the dispensing device 31 comprises a means for keeping the product at a temperature that prevents the product from spoiling, e.g., a refrigeration means that prevents spoilage through unwanted microbial growth. Similarly, in alternative embodiments, the dispensing device 31 comprises a means for heating a product to a desired temperature, e.g., warming a refrigerated product to body temperature or heating a product to an elevated temperature to make it more palatable or desirable.

The processor 32 can be programmed to store information about one or more animals and/or be programmed for controlling the dispensing mechanisms 38. In addition, the processor 32 can be programmed with information about the amount and type of a product selected from the group consisting of water, beverages, foods, supplements, medications, or a combination thereof that is contained within the dispensing device. In another embodiment, the processor 32 is pre-programmed with information about one or more characteristics of one or more animals. The characteristics can be related to the identity, age, weight, caloric needs, health status, or a combination thereof of the animal.

In another embodiment, the invention provides a dispensing system 100 comprising a dispensing device 131 comprising a motion detector 140, a processor 132, a dispensing mechanism 138, and one or more product storage chambers 137. The motion detector 140 can be a separate device attached to the dispensing device 131 or incorporated as part of the dispensing device 131 in a single assembly. The processor 132 can be configured to receive a communication generated from the motion detector 140. For example, the processor 132 can be capable of controlling the dispensing device 131 to dispense a product in response to a motion of an animal detected by the motion detector 140. The processor 132 can contain information about the nutritional products located in one or more storage chambers 137 of the dispensing device 131. The information can be directed to one or more animals and be used by the processor 132 to control the amount and type of nutritional product dispensed in response to the motion sensor 140 activation.

The dispensing device processor 132 can comprise programmed information about one or more animals. The processor 132 can be configured using one or more algorithms that determine when to dispense a product from the dispensing device 131 based upon programmed information about an animal and an activation of the motion detector 140 by the animal.

The dispensing system 100 comprising the motion detector 140 can also incorporate an activity monitoring device 111 configured to communicate with the processor 132. The activity monitoring device 111 can comprise information directed to the heart rate, activity, weight, height or a combination thereof of the animal wearing the activity monitoring device 111.

In an alternative embodiment, the invention provides a dispensing system 200 comprising a transmitter 212 constructed and arranged to attach to an animal, and a dispensing device 231 comprising a sensor 240, a processor 232, a dispensing mechanism 238, and one or more product storage chambers 237. The processor 232 can be linked to the transmitter 212 and be configured to receive a communication generated from the transmitter 212. The transmitter 212 can be programmed with information directed to animal identification, animal food preferences, animal calorie requirements, animal nutritional requirements, or a combination thereof of the animal wearing the transmitter. In various embodiments, the system 200 is modular; the system 200 comprises multiple devices and is useful for multiple animal households.

The dispensing device processor 232 can contain information about the nutritional products in one or more storage chambers 237. Information about one or more animals can be used by the processor 232 to control the type and amount of nutritional product dispensed for a particular animal in response to the transmitter 212, which can identify the animal and its requirements for the amount and type of nutritional product to be fed to the animal. In this regard, the dispensing systems 200 can be useful for controlling nutritional products consumed by various animals, especially animals that consume multiple meals per day and need to have a proper nutritional regimen for controlling caloric intake, maintaining appropriate glucose levels, and promoting urinary tract health.

The dispensing device processor 232 can be capable of controlling the dispensing device 231 to dispense a product in response to the communication from the transmitter 212. In an embodiment, the processor 232 can comprise programmed information directed to the types of food stored in the dispensing device 231, quantity of food stored in the dispensing device 231, animal identification, animal food preferences, animal calorie requirements, animal nutritional requirements, or a combination thereof.

The dispensing system 200 comprising the transmitter 212 can also incorporate an activity monitoring device 211 configured to communicate with the dispensing device processor 232. The activity monitoring device 211 can comprise information related to heart rate, activity, weight, height or a combination thereof of the animal wearing the activity monitoring device 211. In an embodiment, the transmitter 212 and the activity monitoring device 211 comprise a single unitary device that can be attached to the animal.

In yet another embodiment, the invention provides a method of providing nutrition. The nutrition can be provided in the form of various nutritional products to one or more animals. The method comprises providing an activity monitoring device, and dispensing a product from a dispensing device comprising a processor. The product can be dispensed upon the processor receiving a communication from the activity monitoring device. The method can also comprise dispensing the product from the dispensing device at predetermined intervals such as, for example, every hour or every two hours.

In another aspect, the invention provides a method for dispensing a product. The method comprises providing a dispensing device comprising a motion detector, a dispensing mechanism, one or more product storage chambers and a processor configured to receive a communication from the motion detector. The method further comprises dispensing a product from the dispensing device upon the processor receiving a communication generated from the motion detector detecting the presence of an animal. The processor can be configured using an algorithm that determines when to dispense a product from the dispensing device based upon programmed information about the animal and an activation of the motion detector by the animal.

The method can also comprise attaching to the animal an activity monitoring device configured to communicate with the processor. The activity monitoring device can work on conjunction with the motion detector in dispensing the product from the dispensing device. The activity monitoring device can comprise information related to the heart rate, activity, weight, height or a combination thereof of the animal wearing the activity monitoring device.

In an alternative embodiment, the invention provides a method for dispensing a product. The method comprises attaching a transmitter to an animal, and dispensing a product from a dispensing device comprising a sensor, a processor linked to the sensor, a dispensing mechanism, and one or more product storage chambers. The product can be dispensed upon the sensor receiving a communication generated from the transmitter.

The method can also comprise attaching to the animal an activity monitoring device configured to communicate with the processor. The activity monitoring device can comprise information related to the heart rate, activity, weight, height or a combination thereof of an animal wearing the activity monitoring device. The activity monitoring device can work on conjunction with the transmitter in dispensing the product from the dispensing device.

In another aspect, the invention provides a method for promoting weight management for an animal. The method comprises attaching an activity monitoring device to the animal and dispensing a nutritional product from a dispensing device comprising a processor. The nutritional product can be dispensed upon the processor receiving a communication from the activity monitoring device based on an activity or calorie expenditure of the animal. The processor can be programmed to meet specific caloric and nutritional requirements of the, animal. In preferred embodiments, the animal is a pet or companion animal such as a dog or cat.

In another aspect, the invention provides a method for ensuring compliance with prescribed nutrition or medication regimes. The method comprises attaching an activity monitoring device to the animal and dispensing a nutritional product from a dispensing device comprising a processor. The nutritional product can be dispensed upon the processor receiving a communication from the activity monitoring device based on a set or programmed schedule for administering nutrition or medication to the animal. The processor can be programmed to meet specific timing and amounts of nutrition or medication. In preferred embodiments, the animal is a pet or companion animal such as a dog or cat that is receiving veterinary prescribed foods or medications.

In a further aspect, the invention provides kits suitable for providing nutritional and related products to animals. The kits comprise in separate containers in a single package or in separate containers in a virtual package, as appropriate for the kit component, a nutritional or other product intended for use with a dispensing system comprising an activity monitoring device and a dispensing device comprising a processor configured to receive a communication generated by the activity monitoring device, wherein the processor is capable of controlling the dispensing device to dispense a product in response to the communication from the activity monitoring device, and one or more of (1) a dispensing system comprising an activity monitoring device and a dispensing device comprising a processor configured to receive a communication generated by the activity monitoring device, wherein the processor is capable of controlling the dispensing device to dispense a product in response to the communication from the activity monitoring device; (2) an activity monitoring device intended for use with the dispensing system; (3) instructions for how to operate the activity monitoring device; and (4) instructions for how to use the dispensing system in conjunction with the nutritional or other product. When the kit comprises a virtual package, the kit is limited to instructions in a virtual environment in combination with one or more physical kit components.

In preferred embodiments, the nutritional or other product is selected from the group consisting of water, beverages, foods, treats, toys, supplements, medications, medicaments, and combinations thereof.

The kit may contain the kit components in any of various combinations. In one embodiment, the kit contains an activity monitoring device and one or more ingredients suitable for consumption by an animal. In a preferred embodiment, the ingredients are contained in a package that is configured to correspond to a slot in the dispensing device. In this embodiment, the food is dispensed as appropriate and the empty package is conveniently discarded. In one embodiment, the kit comprises a nutritional or other product and instructions for how to use the product in combination with the dispensing system. In another, kit comprises an activity monitoring device and instructions for how to use the device in combination with the dispensing system. In a preferred embodiment, the kit comprises a nutritional or other product intended for use with the dispensing system and instructions for how to use the dispensing system in conjunction with the nutritional or other product. Various such combinations are within the scope of the present invention. The kit may contain additional items such as a device for cleaning the dispensing device or a device for containing dispensed food, e.g., a food bowl.

In another aspect, the present invention provides a means for communicating information about or instructions for one or more of (1) using a dispensing system comprising an activity monitoring device and a dispensing device comprising a processor configured to receive a communication generated by the activity monitoring device, wherein the processor is capable of controlling the dispensing device to dispense a product in response to the communication from the activity monitoring device, to provide a nutritional or other product to an animal, particularly to dispense the product to the animal; (2) using a nutritional or other product intended for use with a dispensing system comprising an activity monitoring device and a dispensing device comprising a processor configured to receive a communication generated by the activity monitoring device, wherein the processor is capable of controlling the dispensing device to dispense a product in response to the communication from the activity monitoring device, in combination with the dispensing system; and (3) using the kits of the present invention to provide nutritional or other products to an animal. The means comprises a document, digital storage media, optical storage media, audio presentation, or visual display containing the information or instructions. In certain embodiments, the communication means is a displayed web site, visual display kiosk, brochure, product label, package insert, advertisement, handout, public announcement, audiotape, videotape, DVD, CD-ROM, computer readable chip, computer readable card, computer readable disk, computer memory, or combination thereof containing such information or instructions. Useful information includes one or more of contact information for consumers to use if they have a question about the invention and its use, e.g., technical assistance. Useful instructions include product amounts and administration amounts and frequency. The communication means is useful for instructing on the benefits of using the present invention and communicating the approved methods for using the invention for the benefit of the animal.

In another aspect, the present invention provides a package comprising a material suitable for containing a nutritional or other product intended for use with a dispensing system comprising an activity monitoring device and a dispensing device comprising a processor configured to receive a communication generated by the activity monitoring device, wherein the processor is capable of controlling the dispensing device to dispense a product in response to the communication from the activity monitoring device, and a label affixed to the package containing a word or words, picture, design, acronym, slogan, phrase, or other labeling device, or combination thereof, that indicates that the contents of the package contains a nutritional or other product intended for use with the dispensing system. Any package or packaging material suitable for containing the nutritional or other product is useful in the invention, e.g., a bag, box, bottle, can, pouch, and the like manufactured from paper, plastic, foil, metal, and the like. In a preferred embodiment, the package contains a food composition adapted for use with the dispensing system.

The invention is useful in several aspects. For example, the delivery of fresh food to the animal has many know health benefits, particularly when delivered at regular intervals. Similarly, the delivery of foods containing water or deliver of water benefits the animal by maintaining appropriate hydration levels essential in maintaining healthy glucose levels and promoting urine pHs required to promote a healthy urinary tract, again particularly when delivered at desired intervals.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A dispensing system comprising:
an activity monitoring device; and
a dispensing device comprising a product storage chamber, comprising a bar code reader configured to identify types of food used with the dispensing device, and further comprising a processor configured to receive a communication generated by the activity monitoring device, wherein the processor is capable of controlling the dispensing device to dispense a product from the product storage chamber in response to the communication from the activity monitoring device, the communication comprises a measurement corresponding to a status of an animal wearing the activity monitoring device, the product dispensed from the product storage chamber is a selected type of food determined by the processor based at least partially on the status of the animal, and the status is selected from the group consisting of heart rate, activity, weight, height, and combinations thereof; wherein the product dispensed by the dispensing device correlates with the animal's activities in the communication generated by the activity monitoring device and wherein when the activity monitoring device approaches the dispensing device to within a specified distance, the activity monitoring device communicates with the processor and the processor dispenses the product.

2. The dispensing system of claim 1 wherein the processor is configured to control the dispensing device to dispense an amount of the product that is at least partially based on a calorie expenditure of the animal wearing the activity monitoring device, at least one of the activity monitoring device or the processor of the dispensing device is configured to determine the calorie expenditure, and the selected type of food is determined by the processor based at least partially on the calorie expenditure.

3. The dispensing system of claim 1 wherein the processor is configured to control the dispensing device to dispense an amount of the product that is correlated with an amount of activity of the animal wearing the activity monitoring device, and the selected type of food is correlated with the amount of activity of the animal.

4. The dispensing system of claim 1 wherein the dispensing device comprises a timing device configured to be programmed with a schedule of product dispensation that is followed by the dispensing device.

5. The dispensing system of claim 1 wherein the activity monitoring device is selected from the group consisting of an accelerometer, a pedometer, and combinations thereof.

6. The dispensing system of claim 1 wherein the dispensing device is constructed and designed to dispense a product selected from the group consisting of water, beverages, foods, treats, toys, supplements, medications, and combinations thereof.

7. The dispensing system of claim 1 wherein the activity monitoring device is configured to wirelessly communicate with the dispensing device.

8. The dispensing device of claim 1 wherein the processor is configured to control the dispensing device to dispense the product at least partially based on information about the amount and type of a product selected from the group consisting of water, beverages, foods, treats, toys, supplements, medications, and combinations thereof that is contained within the dispensing device, and the processor is configured to store the information.

9. The dispensing device of claim 1 wherein the processor is configured to control the dispensing device to dispense the product at least partially based on information about a characteristic of the animal wearing the activity monitoring device, and the processor is configured to store the information.

10. The dispensing device of claim 9 wherein the characteristic of the animal is selected from the group consisting of weight, caloric needs, health status, and combinations thereof, and the algorithm of the processor uses the information to determine an amount, a time and the selected type of food to dispense from the product storage chamber.

11. A dispensing system comprising:
a transmitter constructed and arranged to attach to an animal; and
a dispensing device comprising a sensor, a processor, a dispensing mechanism, and at least one product storage chamber, the processor being linked to the sensor and configured to receive a communication generated from the transmitter, the communication comprises a measurement corresponding to a status of an animal wearing the transmitter, the status is selected from the group consisting of heart rate, activity, weight, height, and combinations thereof, the processor is configured to control the dispensing mechanism to dispense a product from the at least one product storage chamber based at least partially on the measurement, and the product dispensed from the at least one product storage chamber is a selected type of food determined by the processor based at least partially on the status of the animal; wherein the product dispensed by the dispensing device correlates with the animal's activities in the communication generated by the activity monitoring device and wherein when the activity monitoring device approaches the dispensing device to within a specified distance, the activity monitoring device communicates with the processor and the processor dispenses the product.

12. The dispensing system of claim 11 wherein the communication comprises information about the animal selected from the group consisting of animal identification, animal food preferences, animal calorie requirements, animal nutritional requirements, and combinations thereof.

13. The dispensing system of claim 11 wherein the processor is configured to determine an amount of the product to dispense from the at least one product storage chamber based at least partially on a heart rate of the animal, and the product dispensed from the at least one product storage chamber is a selected type of food determined by the processor based at least partially on the heart rate of the animal.

14. The dispensing system of claim 11 wherein the processor is configured to control the dispensing mechanism to dispense a product from the at least one product storage chamber based at least partially on programmed information selected from the group consisting of types of food stored in the dispensing device, quantity of food stored in the dispensing device, animal identification, animal food preferences, animal calorie requirements, animal nutritional requirements, and combinations thereof, and the product selected type of food is determined by the processor based at least partially on the programmed information.

15. The dispensing system of claim 11 further comprising an activity monitoring device configured to generate the measurement that is in the communication received by the processor of the dispensing device.

16. The dispensing system of claim 15 wherein the activity monitoring device is selected from the group consisting of an accelerometer, a pedometer, and combinations thereof.

* * * * *